United States Patent
Nakazato

(10) Patent No.: US 8,162,166 B2
(45) Date of Patent: Apr. 24, 2012

(54) HOLE PLUG

(75) Inventor: Hiroshi Nakazato, Kanagawa (JP)

(73) Assignee: Piolax Inc., Yokohama-Shi, Kanagawa (JP)

( * ) Notice: Subject to any disclaimer, the term of this patent is extended or adjusted under 35 U.S.C. 154(b) by 839 days.

(21) Appl. No.: 11/984,797

(22) Filed: Nov. 21, 2007

(65) Prior Publication Data

US 2008/0142517 A1    Jun. 19, 2008

(30) Foreign Application Priority Data

Nov. 24, 2006    (JP) ................. P2006-316615

(51) Int. Cl.
*B65D 41/00*    (2006.01)
*B65D 39/00*    (2006.01)
(52) U.S. Cl. ............ 220/359.4; 220/787; 220/789
(58) Field of Classification Search ........... 220/359.1, 220/359.4, 787, 789
See application file for complete search history.

(56) References Cited

U.S. PATENT DOCUMENTS

| | | | | |
|---|---|---|---|---|
| 4,091,962 A | * | 5/1978 | van Buren, Jr. | 220/326 |
| 4,290,536 A | * | 9/1981 | Morel | 220/789 |
| 4,363,420 A | * | 12/1982 | Andrews | 220/787 |
| 5,454,479 A | | 10/1995 | Kraus | |
| 2006/0186130 A1 | * | 8/2006 | Jatzke et al. | 220/789 |
| 2007/0108216 A1 | | 5/2007 | Kurth et al. | |

FOREIGN PATENT DOCUMENTS

| | | |
|---|---|---|
| CN | 1839062 A | 9/2006 |
| DE | 10 2005 021 463 A1 | 2/2006 |
| JP | 51-99759 A | 9/1976 |
| JP | 2-293278 | 12/1990 |
| JP | 7-71601 A | 3/1995 |
| JP | 2002-308319 A | 10/2002 |

OTHER PUBLICATIONS

DE 203 04 994 U1.*
DE 103 33 578 B3.*
Chinese Patent Application No. 2007 10188074.2 Office Action dated May 27, 2010, with English translation.
Japanese Office Action mailed Apr. 26, 2011 with an English translation thereof.

* cited by examiner

*Primary Examiner* — Anthony Stashick
*Assistant Examiner* — James N Smalley
(74) *Attorney, Agent, or Firm* — McGinn IP Law Group, LLC

(57) ABSTRACT

A hole plug comprising: a main body part including a cover flange portion for covering an opening, an insertion portion extended from a central portion of a back surface of the cover flange portion to be inserted into the opening, and an engaging portion formed on an outer periphery of the insertion portion to be engaged with a back side peripheral edge of the opening; a thermo-softening resin member mounted on a peripheral edge of the cover flange portion and allowed to flow into a clearance between the cover flange portion and an opening peripheral edge of the plate-shaped member, thereby fixing them together; and an elastic flange portion extended in a skirt-like manner from the back surface of the cover flange portion toward the peripheral edge of the opening and elastically contactable with the peripheral edge of the opening of the plate-shaped member.

22 Claims, 6 Drawing Sheets

HOLE PLUG

BACKGROUND OF THE INVENTION

1. Field of the Invention

The present invention relates to a hole plug which is used to close, for example, an opening formed in a plate-shaped member provided in a vehicle such as a car.

2. Description of the Related Art

For example, in a plate-shaped member such as a body panel provided in a car, there are formed two or more openings which are used in an assembling step or the like. As a hole plug for closing these openings, in JP-A-2-293278, there is disclosed a hole plug which includes: a main body including a base portion having a diameter larger than the opening of the plate-shaped member and an insertion portion to be inserted into the opening; and, a ring-shaped thermo-softening resin member (a meltable member) for fixing the main body to the edge portions of the openings.

In the above hole plug, on the entire areas of the outer periphery of the insertion portion, there is provided an enlarged head portion which is engageable with the back side peripheral edges of the openings. The enlarged head portion is has such a shape that the base end side thereof has a diameter slightly larger than the above-mentioned opening and the diameter of the enlarged head portion reduces toward the leading end side thereof. And, in operation, the insertion portion is inserted into the openings of the plate-shaped member, the enlarged head portion is engaged with the back side peripheral edges of the openings to thereby fix the hole plug provisionally, and, after then, the thermo-softening resin member is heated and melted, whereby the hole plug can be mounted onto the plate-shaped member.

SUMMARY OF THE INVENTION

However, in the above-mentioned hole plug disclosed in JP-A-2-293278, since the enlarged head portion is provided on the entire areas of the outer periphery of the insertion portion and the base end portion side thereof has a diameter larger than the opening, there is found a problem that the insertion resistance of the insertion portion is large when it is inserted into the openings to thereby engage the enlarged head portion with the openings.

To solve this problem, for example, there is proposed a hole plug structured such that, in the two or more portions of the outer periphery of the insertion portion, there are provided flexible securing legs which can be respectively engaged with the back side peripheral edges of the openings. However, in such hole plug, there is found a fact that, since there are formed clearances between the inner peripheries of the openings and the outer periphery of the insertion portion, when heating and melting the thermo-softening resin member, the melted thermo-softening resin can flow into the back side of the plate-shaped member from these clearances.

For this reason, when the above hole plug is applied to a plate-shaped member such as a car body panel on which a so called baking painting finish is enforced, there is a fear that the thermo-softening resin having flowed to the back side of the plate-shaped member can be caused to fly around in a stringy manner due to the hot wind or the like, and can stick to the portion of the car body panel existing above such back side thereof, resulting in the poor painting of the body panel.

Thus, it is an object of the invention to provide a hole plug which, without increasing its insertion resistance, can positively prevent the melted thermo-softening resin from flowing to the back side of the plate-shaped member.

In attaining the above object, according to the first aspect of the invention, there is provided a hole plug for closing an opening formed in a plate-shaped member, including: a main body part including a cover flange portion for covering the opening, an insertion portion extended from a central portion of a back surface of the cover flange portion to be inserted into the opening, and an engaging portion formed on an outer periphery of the insertion portion to be engaged with a back side peripheral edge of the opening; a thermo-softening resin member mounted on a peripheral edge of the cover flange portion and, when heated and melted, allowed to flow into a clearance between the cover flange portion and an opening peripheral edge of the plate-shaped member, thereby fixing them together; and an elastic flange portion extended in a skirt-like manner from the back surface of the cover flange portion of the main body part toward the peripheral edge of the opening and elastically contactable with the peripheral edge of the opening of the plate-shaped member.

According to the first aspect of invention, when the insertion portion of the plug main body is inserted into the openings of the plate-shaped member, the engaging portion provided on the outer periphery of the insertion portion is engaged with the back side peripheral edges of the openings, whereby the hole plug can be mounted onto the plate-shaped member. In this state, the skirt-shaped elastic flange portion is elastically contacted with the front side peripheral edges of the openings of the plate-shaped member.

And, when the plate-shaped member and hole plug are heated up to or more than the melting temperature of the thermo-softening resin member, the thermo-softening resin member melts and flows into a clearance between the cover flange portion and the opening peripheral edge of the plate-shaped member to thereby fix them together.

At then time, since the elastic flange portion is elastically contacted with the opening peripheral edge of the plate-shaped member, even when the engaging portion to be engaged with the openings of the plate-shaped member is not provided over the entire periphery of the plug main body insertion portion, the melt thermo-softening resin member can be prevented from flowing into the back surface side of the plate-shaped member through the clearance between the insertion portion of the hole plug and the openings of the plate-shaped member. This can prevent the occurrence of such inconvenience without increasing the insertion resistance of the hole plug, that, for example, under the hot wind atmosphere in a car baking painting finishing process, the thermo-softening resin having flowed to the back surface side of the plate-shaped member can fly around in a stringy manner and stick to the body of the car or the like to thereby cause the poor painting.

According to a second aspect of the invention, in the first aspect of the invention, there is provided a hole plug in which the thermo-softening resin member is insert molded in a shape capable of sandwiching the entire periphery of the peripheral edge portion of the cover flange portion and is mounted on the cover flange portion.

According to the second aspect of the invention, since the thermo-softening resin member is insert molded in a shape capable of sandwiching the entire periphery of the peripheral edge portion of the cover flange portion, it can be mounted onto the cover flange portion firmly. That is, although the provision of the elastic flange portion on the back side of the cover flange portion reduces the portion of the thermo-softening resin member to be engaged with the back side peripheral edge of the cover flange portion, owing to the insert molding of the thermo-softening resin member, the thermo-softening resin member can be mounted onto the cover flange portion integrally, thereby eliminating a fear that the thermo-softening resin member can be removed from the cover flange portion.

According to a third aspect of the invention, in the first or second aspect of the invention, there is provided a hole plug in which the thermo-softening resin member has a melting temperature of 60 to 100° C.

According to the third aspect of the invention, since there is used the thermo-softening resin member which has a melting temperature of 60 to 100° C. and thus can be melted relatively easily, even when a baking painting finish or the like is enforced on the plate-shaped member at a low process temperature, the thermo-softening resin member can be easily softened. As a result of this, the thermo-softening resin member can be adhered to the plate-shaped member quickly, which not only can enhance the efficiency of the fixing operation but also can enhance the sealing performance between the thermo-softening resin member and the surface of the plate-shaped member. Also, even when a thermo-softening resin member having a relatively low melting temperature is used, the above-mentioned elastic flange portion can prevent the melted thermo-softening resin from flowing into the back surface side of the plate-shaped member.

According to the hole plug of the invention, in a state where the hole plug is mounted on the plate-shaped member and the skirt-shaped elastic flange portion is elastically contacted with the front side peripheral edges of the openings of the plate-shaped member, when the plate-shaped member and hole plug are heated up to or higher than the melting temperature of the thermo-softening resin member, the thermo-softening resin member melts and flows into the clearances respectively existing between the cover flange portion and the peripheral edges of the openings of the plate-shaped member to thereby fix them together.

At the then time, since the elastic flange portion is elastically contacted with the peripheral edges of the openings of the plate-shaped member, even when the engaging portion to be engaged with the openings of the plate-shaped member is not provided over the entire periphery of the plug main body insertion portion, the melt thermo-softening resin member can be prevented from flowing into the back surface side of the plate-shaped member through the clearances between the insertion portion of the hole plug and the openings of the plate-shaped member. This can prevent the melted thermo-softening resin member from sticking to the body of the car and thus can prevent the occurrence of the poor paining without increasing the insertion resistance of the hole plug.

BRIEF DESCRIPTION OF THE DRAWINGS

These and other objects and advantages of this invention will become more fully apparent from the following detailed description taken with the accompanying drawings in which:

FIG. 2A is a plan view thereof, FIG. 2B is a front view thereof, and FIG. 2C is a bottom view thereof, respectively;

FIG. 3A is a section view taken along the A-A arrow line shown in FIG. 2A, and FIG. 3B is a section view taken along the A-A' arrow line shown in FIG. 2A;

FIG. 5A is a section view to show a first heating stage, FIG. 5B is a section view to show a second heating stage, FIG. 5C is a section view to show a third heating stage, and FIG. 5D is a section view to show a fourth heating stage; FIG. 6A is a section view to show a plate-plated member having a first shape, FIG. 6B is a section view to show a plate-plated member having a second shape, and FIG. 6C is a section view to show a plate-plated member having a third shape.

DETAILED DESCRIPTION OF THE EMBODIMENTS

Figure 1:
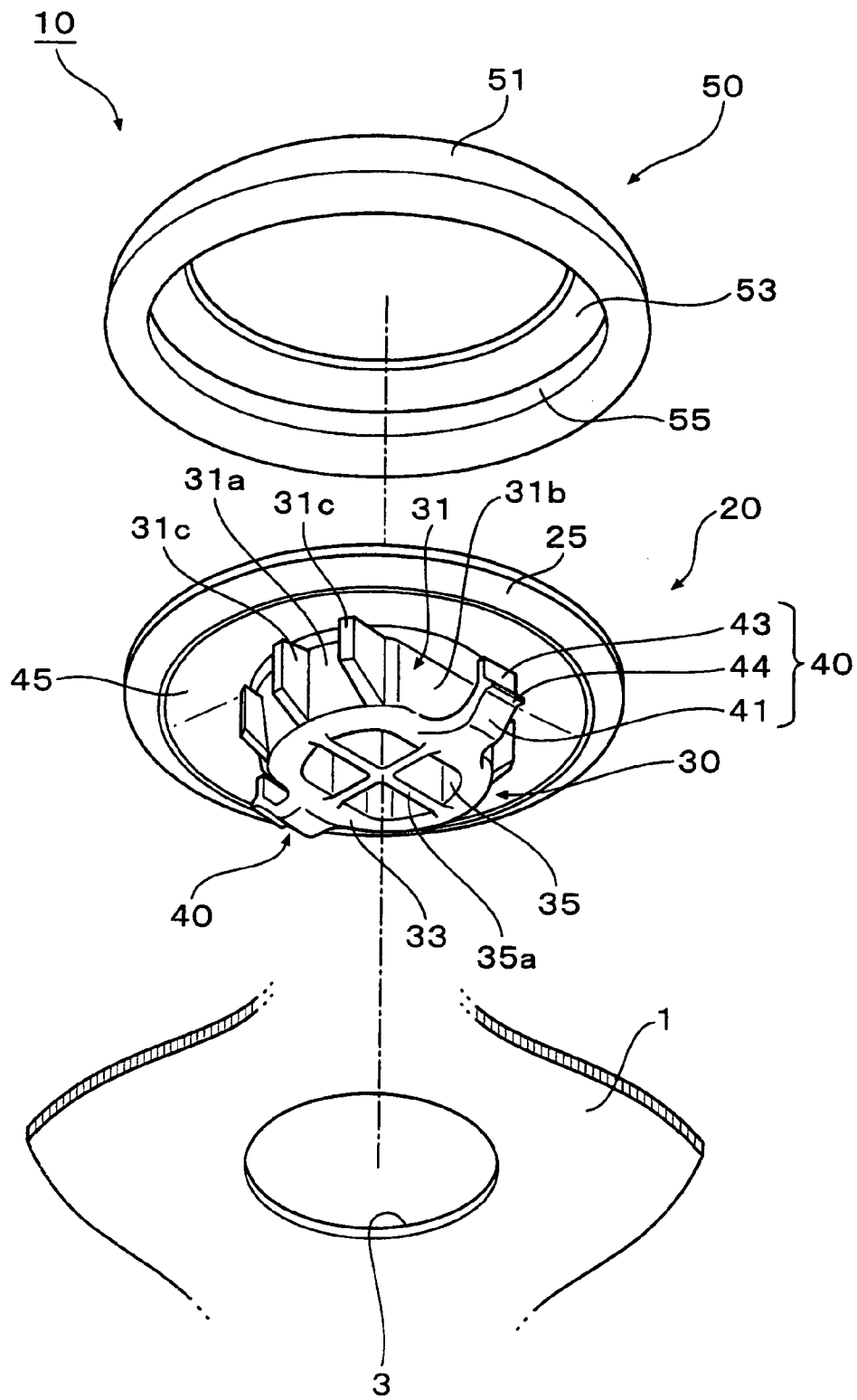
FIG. 1 is a perspective view of an embodiment of a hole plug according to the invention.

Now, description will be given below of an embodiment of a hole plug according to the invention with reference to the accompanying drawings.

This hole plug 10 (which is hereinafter referred to as a plug 10) is used to close, for example, a round-hole-shaped opening 3 formed in a plate-shaped member 1 such as a body panel provided in a car. Specifically, the plug 10, as shown in FIG. 1, includes a main body part 20, and a thermo-softening resin member 50 to be mounted on the cover flange 25 of the main body part 20.

The main body part 20 is made of highly heat-resistant material in consideration of a baking painting process and, according to the present embodiment, it is made of resin material having a melting temperature higher than the melting temperature of a thermo-softening resin member 50 which will be discussed later. And, the main body part 20 includes a disk-shaped cover flange portion 25 formed to have an outside diameter larger than the inside diameter of the opening 3 in order to be able to cover the opening 3, and an insertion portion 30 which is extended from the central portion of the back surface of the cover flange portion 25 and can be inserted into the opening 3.

The insertion portion 30 includes an outer wall portion 31 extended in a cylindrical shape from the back surface of the cover flange portion 25, a bottom wall portion 33 for closing the lower end portion opening of the outer wall portion 31, and an inner wall portion 35 (see FIG. 2B) raised in a trapezoidal shape from the inside of the bottom wall portion 33 toward the cover flange portion 25. In the inside of the inner wall portion 35, there is provided a reinforcing piece 35a having a substantially cross shape.

Also, as shown in FIG. 1, one set of mutually opposing side surfaces of the outer wall portion 31 of the insertion portion 30 are curved in an arc shape to provide arc-shaped surfaces 31a, 31a, whereas the other set of mutually opposing side surfaces are formed flat to provide flat surfaces 31b, 31b respectively. On the outer periphery of each of the two arc-shaped surfaces 31a, 31a, there are projectingly provided three ribs 31c which are used to prevent the shaking movement of the insertion portion 30 when it is inserted into the opening 3.

Figure 2A:
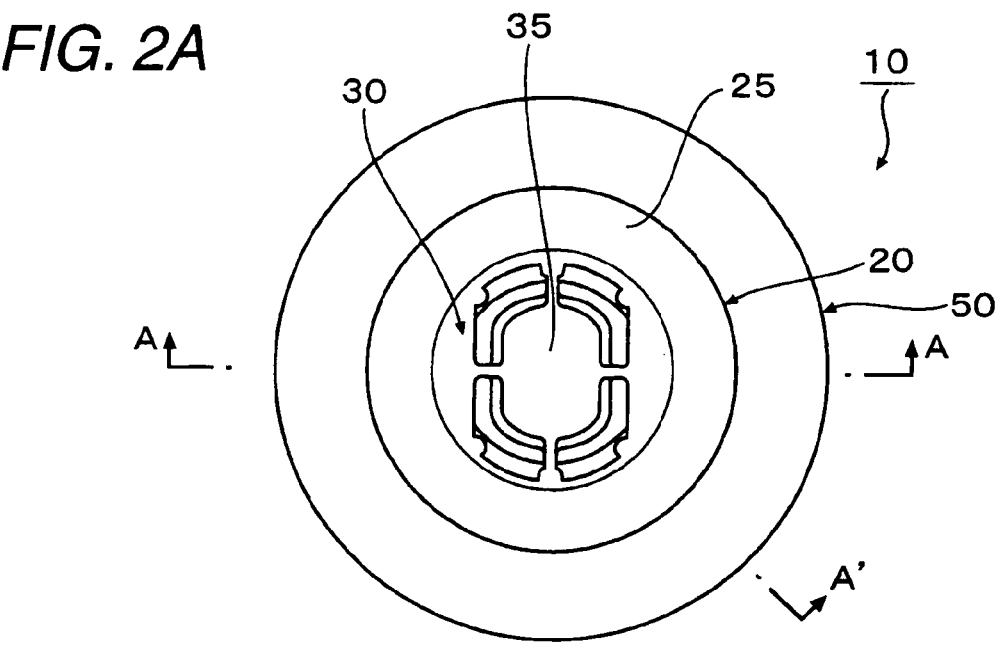
FIGS. 2A to 2C show the hole plug; specifically.
Figure 2B:
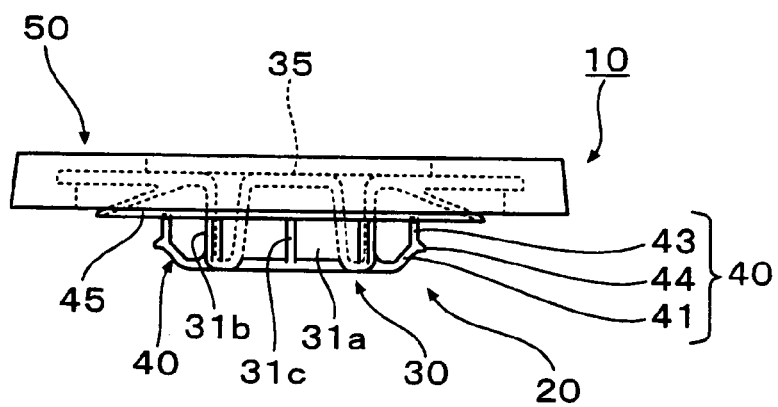
Figure 2C:
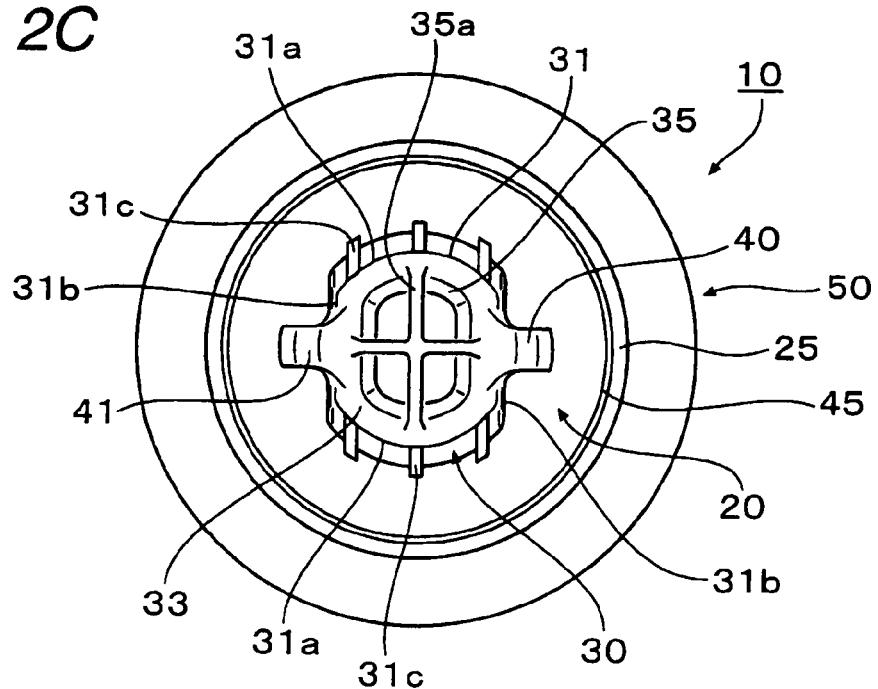

Referring to FIGS. 2A to 2C together with FIG. 1, on the outer peripheries of the flat surfaces 31b, 31b, there are respectively formed engaging portions 40, 40 which can be flexed and can be engaged with the back side peripheral edge of the opening 30. That is, each engaging portion 40 includes: an arm portion 41 which extends horizontally outwardly from the central portion of the base end portion of the flat surface 31b and further extends obliquely outwardly from the leading end of the horizontal section toward the cover flange portion 25; a leading end portion 43 which extends vertically from the leading end of the arm portion 41 toward the cover flange portion 25; and, a pawl portion 44 which projects from the outer side of the corner portions of the arm portion 41 and leading end portion 43 and can be engaged with the back side peripheral edge of the opening 3.

Figure 3A:
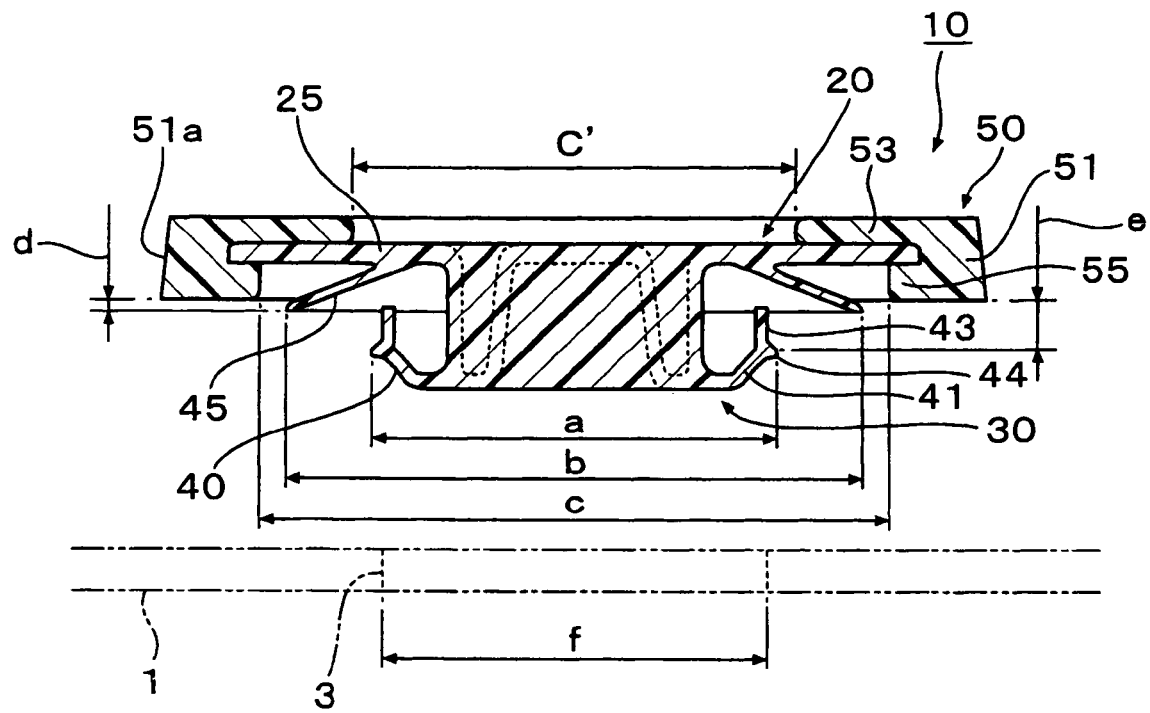
FIGS. 3A and 3B show the hole plug; specifically.
Figure 3B:
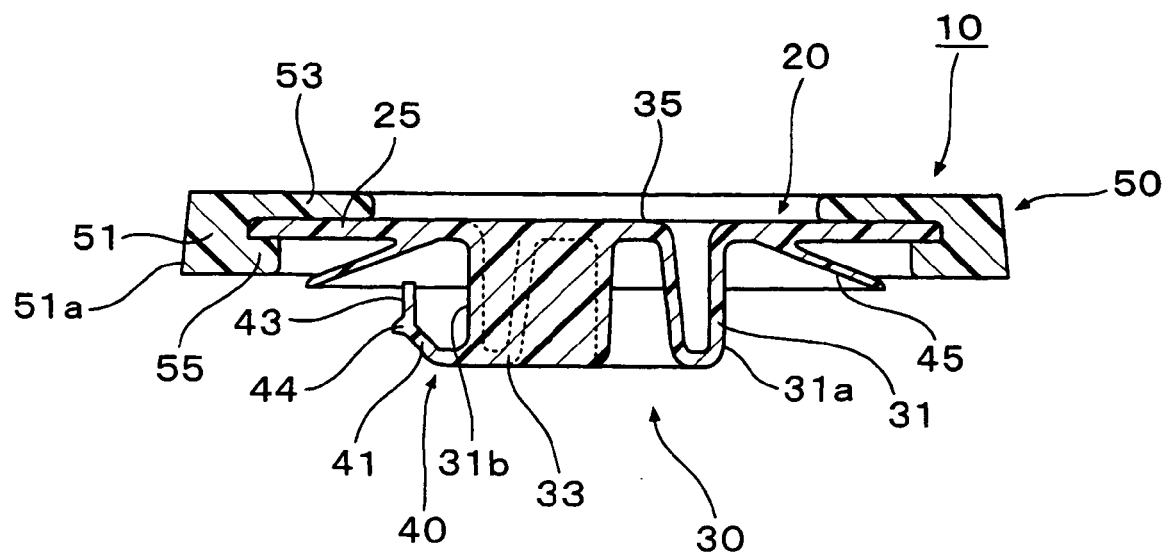

Referring now to FIGS. 3A and 3B in combination with FIGS. 1 and 2A to 2C, on the back surface of the cover flange portion 25, there is formed an elastic flange portion 45 which is extended toward the peripheral edge of the opening 3 in a skirt-like shape and can be elastically contacted with the front side peripheral edge of the opening 3. The elastic flange portion 45 exists on the back surface side of the cover flange portion 25 and extends obliquely downwardly from the peripheral edge of the insertion portion 30 while spreading in a skirt shape.

As shown in FIG. 3A, the outside diameter b of the leading end portion of the elastic flange portion 45 is set larger than the inside diameter f of the opening 3. Also, the lower edge portion of the elastic flange portion 45 is situated such that it projects downward by a length d from the lower end face of the thermo-softening resin member 50.

According to this structure, in a state where not only the insertion portion 30 is inserted into the opening 3 to thereby bring the pair of engaging portions 40, 40 into engagement with the back side peripheral edge of the opening 3 but also the thermo-softening resin member 50 is contacted with the front side peripheral edge of the opening 3 to thereby fix the plug 10 to the opening 3 provisionally, the elastic flange portion 45 can be elastically contacted with the entire areas of the front side peripheral edge of the opening 3.

Next, description will be given below of the thermo-softening resin member 50 to be mounted onto the peripheral edge of the cover flange 25 of the main body part 20. The thermo-softening resin member 50 is made of the same material as a so called hot melt adhesive. The adhesive power of the thermo-softening resin member 50 can be actually exercised when it is heated and melted and is thereafter cooled and hardened. As the material of the thermo-softening resin member 50, there may be selected a material including: a main component, specifically, thermo-softening resin which, when heated, can be softened and, when cooled, can be hardened; and, adhesive resin to be added to the thermo-softening resin. In the present embodiment, for the thermo-softening resin member 50, there is used resin material which includes, as a main component, ethylene vinyl acetate copolymer (EVA) resin and polyolefin resin added to the EVA resin.

The thermo-softening resin member 50, preferably, may have a melting temperature of 60 to 100° C. The melting temperature of lower than 60° C. is not preferred because, under high temperature environments such as in summer, there is a fear that the thermo-softening resin member 50 can melt again. Also, the melting temperature of higher than 100° C. is not preferred either because the temperature in the baking painting must be set high, which results in the increased manufacturing cost of the hole plug.

The thermo-softening resin member 50 includes a ring-shaped portion 51 having an inside diameter substantially corresponding to the outside diameter of the cover flange portion 25, an upper rib 53 projecting inwardly in the radial direction from the thickness-direction upper inner peripheral edge of the ring-shaped portion 51, and a lower rib 55 projecting inwardly in the radial direction from the thickness-direction lower inner peripheral edge of the ring-shaped portion 51 (see FIGS. 3A and 3B).

In this structure, the lower rib 55 projects inwardly in the radial direction more shortly than the upper rib 53, while the inside diameter c of the lower rib 55 is set larger than the inside diameter c' of the upper rib 53 (c'<c). Also, the lower rib 55 is formed larger in thickness than the upper rib 53. That is, the lower rib 55 is formed large in thickness and short in length, whereas the upper rib 53 is formed small in thickness and long in length. Also, on the outer periphery of the ring-shaped portion 51, there is provided a tapered surface 51a the diameter of which gradually increases from the top to the bottom; and, the tapered surface 51a provides the slope that is proper for removal when the thermo-softening resin member 50 is removed from a mold after it is insert molded.

According to the present embodiment, after the thermo-softening resin member 50 is insert molded with respect to the main body part 20, it can be mounted onto the cover flange portion 25 integrally therewith. That is, after the main body part 20 is previously set in the mold frame of an injection molding machine (not shown), the above-mentioned resin material is injected into the cavity of the mold frame which is used to mold the thermo-softening resin member 50, thereby insert molding the thermo-softening resin member 50. At the then time, the thermo-softening resin member 50 is molded in the following manner: that is, the upper rib 53 is engaged with the front side peripheral edge of the cover flange portion 25 and the lower rib 55 is engaged with the back side peripheral edge of the cover flange portion 25 to thereby hold the front and back peripheral edge portions of the cover flange portion 25 by and between the upper and lower ribs; and further, the ring-shaped portion 51 is contacted with the outer peripheral edge of the cover flange portion 25 to thereby sandwich the entire periphery of the peripheral edge portion of the cover flange portion 25.

In this manner, since the thermo-softening resin member 50 is insert molded in such a manner that it sandwiches the entire periphery of the peripheral edge portion of the cover flange portion 25, the thermo-softening resin member 50 can be firmly mounted onto the cover flange portion 25. Also, although the provision of the elastic flange portion 45 on the back side of the cover flange portion 25 reduces the portion of the thermo-softening resin member 50 that is engaged with the back side peripheral edge of the cover flange portion 25, since, owing to the above-mentioned insert molding, the thermo-softening resin member 50 can be mounted on the cover flange portion 25 integrally therewith, the thermo-softening resin member 50 can be prevented from being removed from the cover flange portion 25 and can also be prevented from shaking.

In FIG. 3A, there are shown the dimensions of the main body part 20, the dimensions of thermo-softening resin member 50, and the dimensions of the opening 3 of the plate-shaped member 1 together. That is, where the distance between the pawl portions 44 and 44 of the pair of engaging portions 40 and 40 is expressed as a, the outside diameter of the leading end portion of the elastic flange portion 45 is expressed as b, and the inside diameter of the lower rib 55 of the thermo-softening resin member 50 is expressed as c, the dimensions are set to provide the relation, f<a<b<c. Owing to this, when the plug 10 is inserted into the opening 3 and is fixed provisionally, the elastic flange portion 45 can be elastically contacted with the front side peripheral edge of the opening 3 without interfering with the lower rib 55.

Also, where the height-direction distance from the lower surface of the thermo-softening resin member 50 to the pawl portion 44 of the engaging portion 40 is expressed as e, preferably, e may be set smaller than the thickness of the plate-shaped member 1. Owning to this, the plate-shaped member 1 can be elastically held by and between the thermo-softening resin member 50 and the pawl portion 44 of the engaging portion 40.

Next, description will be given below of how to use the plug 10 having the above structure. Specifically, the insertion portion 30 of the plug 10 with the thermo-softening resin member 50 mounted integrally on the main body part 20 due to the insert molding is inserted into the opening 3 from the front side of the plate-shaped member 1.

Figure 4:
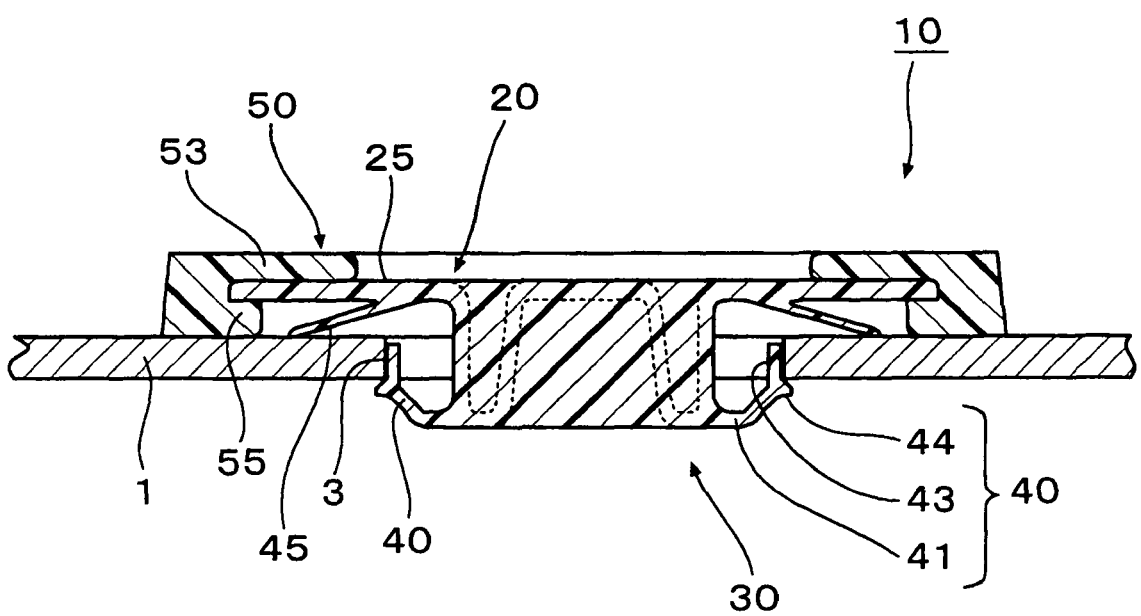
FIG. 4 is a section view, showing a state where the hole plug is provisionally fixed to a plate-shaped member.

Then, the outer peripheries of the respective arm portions 41 are pressed against the inner peripheries of the openings 3, so that the paired engaging portions 40, 40 are caused to flex inwardly. When the pawl portions 44 move beyond the opening 3 and arrive at the back side of the plate-shaped member 1, the pair of engaging portions 40, 40 are allowed to return to their respective initial states elastically, whereby, as shown in FIG. 4, not only the leading end portions 43 are respectively contacted with the inner periphery of the opening 3 but also the pawl portions 44 are respectively engaged with the back side peripheral edge of the opening 3. At the same time, the lower end face of the thermo-softening resin member 50 is contacted with the front side peripheral edge of the plate-shaped member 1, whereby, in a state where the plate-shaped member 1 is held by and between the thermo-softening resin member 50 and engaging portions 40, the plug 10 is fixed to the plate-shaped member 1 provisionally and the opening 3 is closed by the cover flange portion 25.

At the then time, the leading end portion of the elastic flange portion 45, which extends in a skirt-like manner from the back surface of the cover flange portion 25, is structured such that the leading end portion thereof can be pressed against the surface of the plate-shaped member 1 to be thereby slightly flexed outwardly, whereby the leading end portion of the elastic flange portion 45 can be elastically contacted with the entire periphery of the front side peripheral edge of the opening 3 which is formed in a round hole.

Also, as described above, since the insertion portion 30 is inserted into the opening 3 while flexing the pair of engaging portions 40, 40, the insertion portion 30 can be inserted into the opening 3 with a relatively light push-in force, thereby being able to enhance the efficiency of the plug insertion operation.

And, according to the present embodiment, in a state where the plug 10 is provisionally fixed to the opening 3 in the above-mentioned manner, a baking painting is enforced on the plate-shaped member 1; and, the plate-shaped member 1 and plug 10 are respectively heated up to the melting temperature of the thermo-softening resin member 50. As a result of this, the thermo-softening resin member 50 is softened and melted, and is allowed to flow into clearances respectively existing between the cover flange portion 25 and the peripheral edges of the openings 3 of the plate-shaped member 1 to thereby fixedly secure the cover flange portion 25 and plate-shaped member 1 to each other.

Figure 5A:
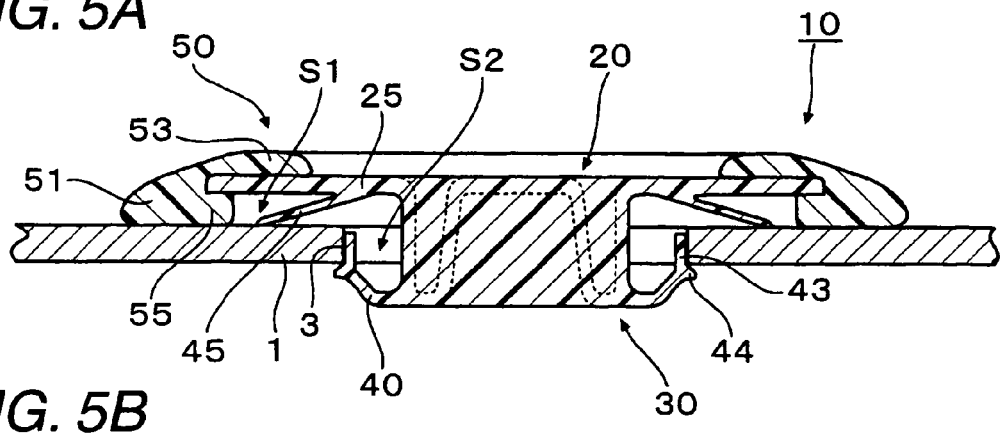
FIGS. 5A to 5D show states where the hole plug is heated and melted; specifically.
Figure 5B:
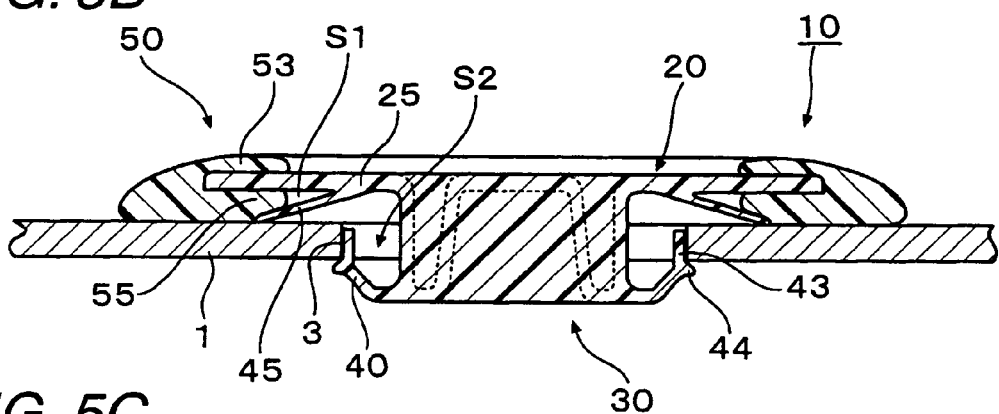

The states of the above-mentioned operation steps are respectively shown in FIGS. 5A to 5D. Specifically, as shown in FIG. 5A, at the initial stage in the heating time, mainly, the portions of the thermo-softening resin member 50 existing in the vicinity of the corner portions of the outer periphery thereof are softened and deformed. When heated further, the melt lower rib 55 flows into a clearance S1 existing between the cover flange portion 25 and the surface of the plate-shaped member 1 and, as shown in FIG. 5B, further flows onto the outer peripheral surface of the elastic flange portion 45 which is elastically contacted with the front side peripheral edge of the opening 3.

Figure 5C:
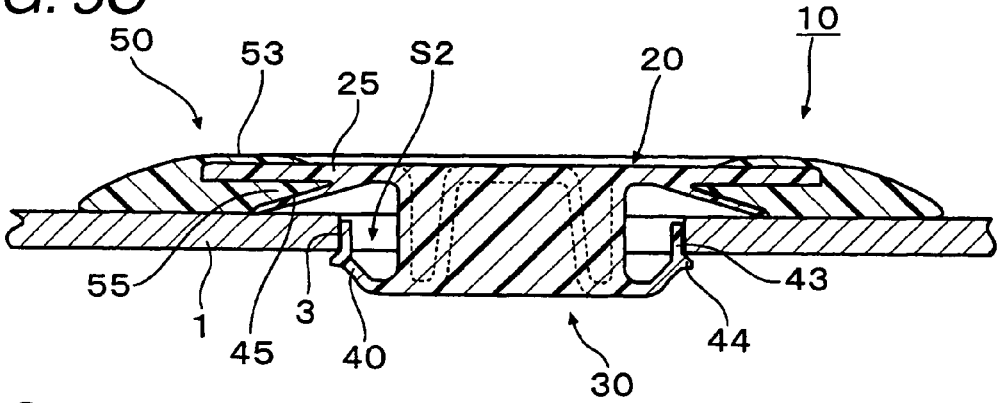
Figure 5D:
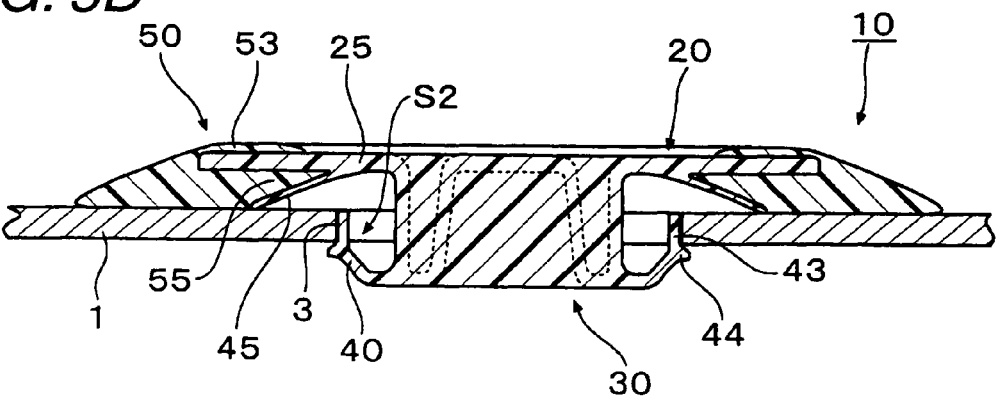

When heated still further, the thermo-softening resin member 50 spreads out outwardly and also, while becoming smaller in thickness, the upper rib 3 flows around downwardly so that, as shown in FIG. 5C, the thermo-softening resin member 50 is charged into the clearance S1 completely. After then, as shown in FIG. 5D, the cover flange portion 25 is raised slightly by the thermo-softening resin member 50 which has melted and collected on the lower side and, in this state, the thermo-softening resin member 50 is cooled and hardened and is thereby fixed to the plate-shaped member 1, so that the plug 10 can be firmly fixed to the opening 3 through the thermo-softening resin member 50.

By the way, when the thermo-softening resin member 50 is heated and melted, as described above, the upper rib 53 flows around downwardly and becomes gradually smaller in thickness. However, according to the present embodiment, since the upper rib 53 is formed to project longer than the lower rib 55, as shown in FIGS. 5A and 5D, it is possible to leave the upper rib 53 on the surface of the cover flange portion 25. Therefore, since the front and back surfaces of the cover flange portion 25 can be maintained in a state where they are held by and between the upper rib 53 and lower rib 55, it is possible to hold a state where the thermo-softening resin member 50 is firmly mounted on the cover flange portion 25.

And, according to the present embodiment, in a state where the plug 10 is provisionally fixed to the opening 3 before heating and melting it, the elastic flange portion 45 is elastically contacted with the front side peripheral edge of the opening 3, whereby the interface between the elastic flange portion 45 and plate-shaped member 1 is sealed completely in a state where the entire periphery of the opening 3 is surrounded by the elastic flange portion 45. Therefore, even when the melted thermo-softening resin member 50 flows into the clearance S1 between the cover flange portion 25 and the surface of the plate-shaped member 1, the elastic flange portion 45 prevents the thermo-softening resin member 50 from flowing into the inner peripheral side of the elastic flange portion 45, with the result that the thermo-softening resin member 50 can be positively prevented from flowing to the back surface side of the plate-shaped member 1 through a clearance S2 (see FIGS. 5A to 5D) existing between the outer periphery of the insertion portion 30 and the inner periphery of the opening 3.

This can prevent the occurrence of such an inconvenience under a hot wind atmosphere in a car baking painting process that the thermo-softening resin member 50 having flowed to the back surface side of the plate-shaped member 1 can fly around upwardly in a stringy manner due to the hot wind and can stick to the body of the car or the like to thereby cause the poor painting of the car.

Also, according to the present embodiment, since there is used the thermo-softening resin member 50 which has a melting temperature of 60 to 100° C., that is, which is relatively easy to melt, even when a baking painting or the like is enforced on the plate-shaped member 1 at a low processing temperature, the thermo-softening resin member 50 can be easily softened. As a result of this, not only the thermo-softening resin member 50 can be adhered to the plate-shaped member 1 quickly to thereby be able to enhance the efficiency of the operation but also the sealing performance between the thermo-softening resin member 50 and plate-shaped member 1 can be enhanced. Also, even when there is used a thermo-softening resin member 50 having a relatively low melting temperature, the elastic flange portion 45 can prevent the thermo-softening resin member 50 from leaking to the back surface side of the plate-shaped member 1.

Figure 6A:
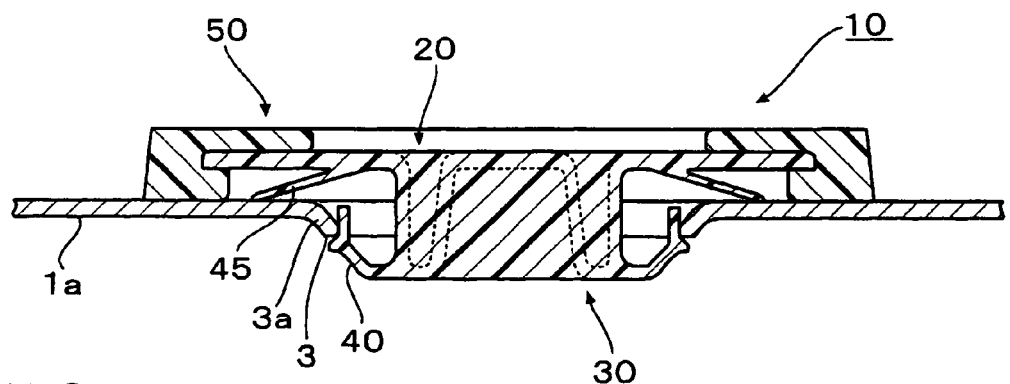
FIGS. 6A to 6C show another shapes of a plate-shaped member onto which the hole plug is to be mounted; specifically.
Figure 6B:
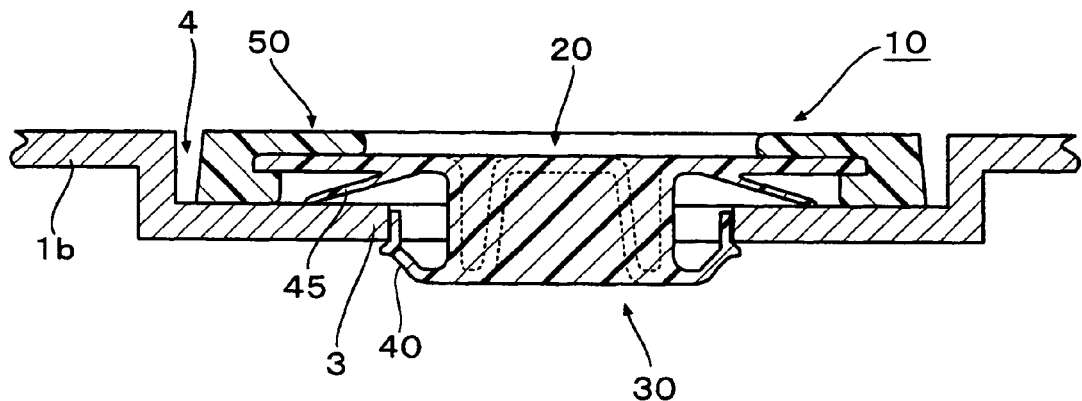
Figure 6C:
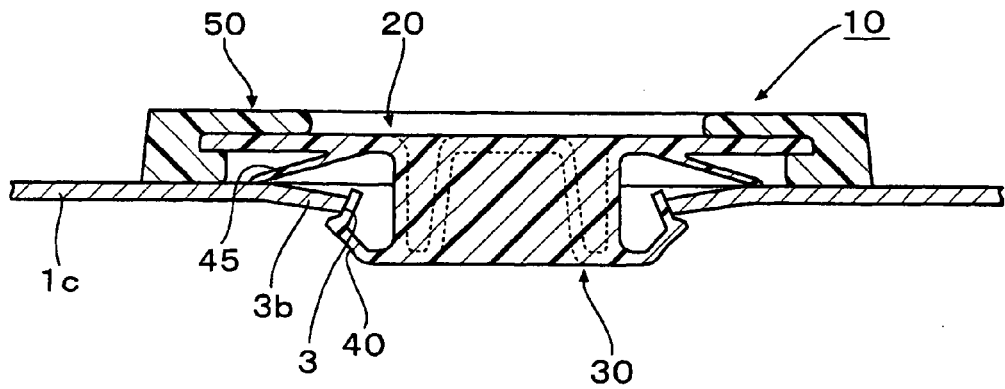

According to the present embodiment, although there is used the plate-shaped member 1 with the round-hole-shaped opening 3 formed therein, this is not limitative but the plate-shaped member may have such a shape as shown in FIGS. 6A to 6C. For example, there may also be used such a plate-shaped member 1a as shown in FIG. 6A which includes a corner portion 3a bent downwardly from the peripheral edge of the opening 3, or such a plate-shaped member 1b as shown in FIG. 6B which includes a recessed portion 4 formed in the peripheral edge portion of the opening 3, or such a plate-shaped member 1c in which the peripheral edge portion of the opening 3 provides an obliquely downward inclined slant portion 3b. In any of these plate-shaped members, since, in a state where the insertion portion 30 of the main body part 20 of the plug 10 is inserted into the opening 3 and the engaging portions 40 are respectively engaged with the back surface peripheral edge of the opening 3, the elastic flange portion 45 is elastically contacted with the front side peripheral edge of the opening 3, it is possible to prevent the melted thermo-softening resin member 50 from flowing to the back surface side of the plate-shaped member through a clearance between the insertion portion 30 and opening 3.

What is claimed is:

1. A hole plug for closing an opening formed in a plate-shaped member, comprising:
    a main body part including a cover flange portion for covering the opening, an insertion portion extended from a central portion of a back surface of the cover flange portion to be inserted into the opening, and an engaging portion formed on an outer periphery of the insertion portion to be engaged with a back side peripheral edge of the opening;
    a thermo-softening resin member mounted on a peripheral edge of the cover flange portion and, formed such that if heated and melted, then a portion of the thermo-softening resin member flows into a clearance between the back surface of the cover flange portion and a front surface of the plate-shaped member around a front side peripheral edge of the opening, thereby fixing them together; and
    an elastic flange portion comprising a conical shape and extending downward and outward from the back surface of the cover flange portion toward the front side peripheral edge of the opening and elastically contactable with the front surface of the plate-shaped member after insertion into the opening.

2. The hole plug according to claim 1, wherein the thermo-softening resin member sandwiches an outer circumference of the peripheral edge portion of the cover flange portion.

3. The hole plug according to claim 1, wherein the thermo-softening resin member comprises a melting temperature of 60° C. to 100° C.

4. The hole plug according to claim 1, wherein the thermo-softening resin member comprises:
    a ring-shaped portion;
    an upper rib extending radially inward from the ring-shaped portion and disposed on a top surface side of a peripheral edge of the cover flange portion; and
    a lower rib extending radially inward from the ring-shaped portion and disposed on a back surface side of the peripheral edge of the cover flange portion.

5. The hole plug according to claim 1, wherein the elastic flange portion comprises a conical shape.

6. A hole plug for closing an opening formed in a plate-shaped member, comprising:
    a main body part including a cover flange portion for covering the opening, an insertion portion extended from a central portion of a back surface of the cover flange portion to be inserted into the opening, and an engaging portion formed on an outer periphery of the insertion portion to be engaged with a back side peripheral edge of the opening;
    a thermo-softening resin member mounted on a peripheral edge of the cover flange portion and, formed such that if heated and melted, then a portion of the thermo-softening resin member flows into a clearance between the back surface of the cover flange portion and a front surface of the plate-shaped member around a front side peripheral edge of the opening, thereby fixing them together; and
    an elastic flange portion comprising a conical shape and extending downward and outward from the back surface of the cover flange portion toward the front side peripheral edge of the opening,
    wherein an inner surface of the elastic flange portion comprises a conical shape and an outer surface of the elastic flange portion comprises a conical shape, and.

7. The hole plug according to claim 1, wherein the elastic flange portion forms a continuous loop comprising a diameter which continuously increases as the elastic flange portion projects away from the cover flange portion.

8. The hole plug according to claim 1, wherein, if the elastic flange portion is pressed against the peripheral edge of the opening of the plate-shaped member, then the elastic flange portion forms a seal around an entirety of the opening.

9. A hole plug for closing an opening formed in a plate-shaped member, comprising:
    a main body part including a cover flange portion for covering the opening, an insertion portion extended from a central portion of a back surface of the cover flange portion to be inserted into the opening, and an engaging portion formed on an outer periphery of the insertion portion to be engaged with a back side peripheral edge of the opening;
    a thermo-softening resin member mounted on a peripheral edge of the cover flange portion and, formed such that if heated and melted, then a portion of the thermo-softening resin member flows into a clearance between the back surface of the cover flange portion and a front surface of the plate-shaped member around a front side peripheral edge of the opening, thereby fixing them together; and
    an elastic flange portion extended from the back surface of the cover flange portion toward the front side peripheral edge of the opening and elastically contactable with the front surface of the plate-shaped member after insertion into the opening,
    wherein a distance between a lower edge portion of the elastic flange portion and the back surface of the cover flange portion is greater than a distance between a lower edge portion of the thermo-softening resin member and the back surface of the cover flange portion.

10. The hole plug according to claim 4, wherein the lower rib comprises a thickness greater than a thickness of the upper rib.

11. The hole plug according to claim 4, wherein the lower rib comprises a length which is less than a length of the upper rib.

12. The hole plug according to claim 1, wherein the elastic flange portion is formed such that, if the engaging portion is engaged with the back side peripheral edge of the opening, then the elastic flange portion is deformed outward from a pressure of the front surface of the plate-shaped member.

13. A hole plug for closing an opening formed in a plate-shaped member, comprising:
    a main body part including a cover flange portion for covering the opening, an insertion portion extended from a central portion of a back surface of the cover flange portion to be inserted into the opening, and an engaging portion formed on an outer periphery of the insertion portion to be engaged with a back side peripheral edge of the opening;

a thermo-softening resin member mounted on a peripheral edge of the cover flange portion and, formed such that if heated and melted, then a portion of the thermo-softening resin member flows into a clearance between the back surface of the cover flange portion and a front surface of the plate-shaped member around a front side peripheral edge of the opening, thereby fixing them together; and an elastic flange portion comprising a conical shape and extending downward and outward from the back surface of the cover flange portion toward the front side peripheral edge of the opening, wherein the elastic flange portion projects from a portion of the cover flange portion radially outward from the insertion portion, and.

14. The hole plug according to claim 1, wherein an inner portion of the elastic flange portion is disposed radially outward of an inner portion of the insertion portion.

15. The hole plug according to claim 1, wherein the elastic flange portion comprises an outer diameter greater than a diameter of the opening.

16. The hole plug according to claim 1, wherein an outer diameter of the elastic flange portion is greater than a maximum diameter of the insertion portion.

17. The hole plug according to claim 1, wherein the elastic flange portion contacts the front surface of the plate-shaped member so as to closely seal the front side peripheral edge of the opening.

18. The hole plug according to claim 1, wherein the back surface of the cover flange portion faces the front surface of the plate-shaped member.

19. A hole closing structure, comprising:
the hole plug of claim 1; and
the plate-shaped member.

20. The hole plug according to claim 1, wherein an outer diameter of the elastic flange portion is greater than an outer diameter of the insertion portion.

21. The hole plug according to claim 1, wherein a radius of an outer surface of the elastic flange portion increases as the elastic flange portion extends away from the cover flange portion.

22. The hole plug according to claim 1, wherein the elastic flange portion comprises an annular skirt.

* * * * *